United States Patent [19]

Slack

[11] Patent Number: 4,576,381
[45] Date of Patent: Mar. 18, 1986

[54] SPIRAL PISTON RING WITH TAPERED ENDS AND RECESSES

[75] Inventor: Don S. Slack, Mill Valley, Calif.
[73] Assignee: Rix Industries, Emeryville, Calif.
[21] Appl. No.: 674,297
[22] Filed: Nov. 23, 1984
[51] Int. Cl.⁴ .............................. F16J 9/04; F16J 9/14
[52] U.S. Cl. ...................................... 277/1; 277/203; 277/222
[58] Field of Search .................. 277/167, 1, 203, 216, 277/219–222

[56] References Cited

U.S. PATENT DOCUMENTS

| | | |
|---|---|---|
| 374,796 | 12/1887 | Law ................................... 277/220 |
| 727,311 | 5/1903 | Douglas et al. . |
| 1,165,084 | 12/1915 | Flammang . |
| 1,711,244 | 4/1929 | Newton . |
| 1,819,890 | 8/1931 | Gleason . |
| 2,809,080 | 10/1957 | Mittell et al. ................... 277/203 X |
| 3,588,125 | 6/1971 | Mastromatteo ................. 277/222 X |

FOREIGN PATENT DOCUMENTS 329863  5/1930  United Kingdom ................ 277/167

Primary Examiner—Robert S. Ward
Attorney, Agent, or Firm—Manfred M. Warren; Robert B. Chickering; Glen R. Grunewald

[57] ABSTRACT

A spiral piston ring made of self-lubricating material and having at least two complete convolutions and having a gradual and continuous taper except for the terminal portions thereof which taper at a steeper angle than the gradual and continuous taper, and with indentations in the convolutions adjacent to the terminal portions which are positioned and which have a size and shape to receive exactly the terminal portions.

4 Claims, 4 Drawing Figures

U.S. Patent  Mar. 18, 1986  4,576,381
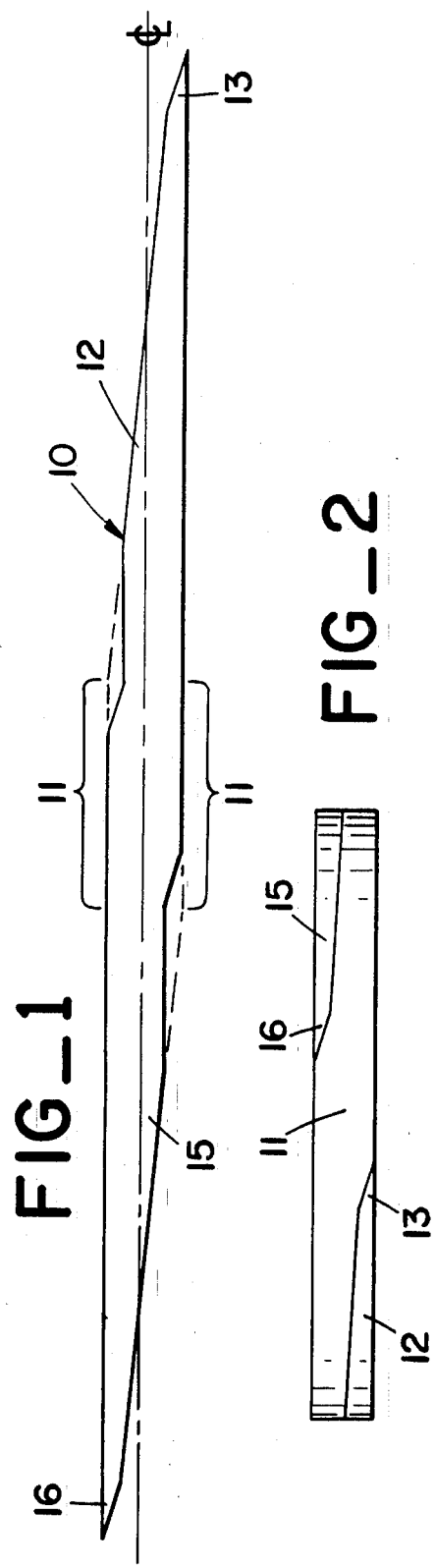
FIG_1
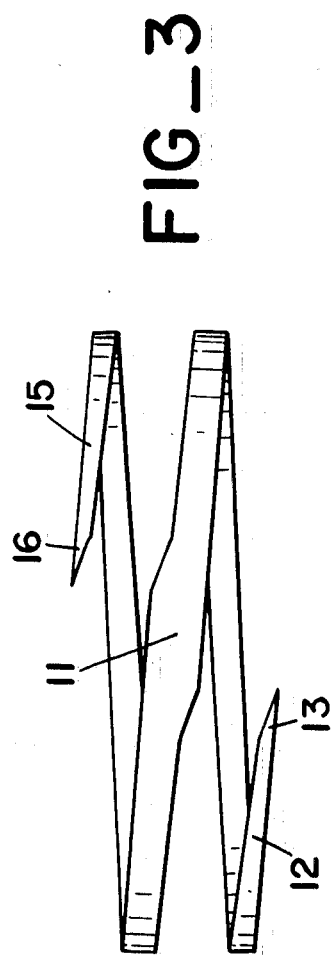
FIG_2  FIG_3
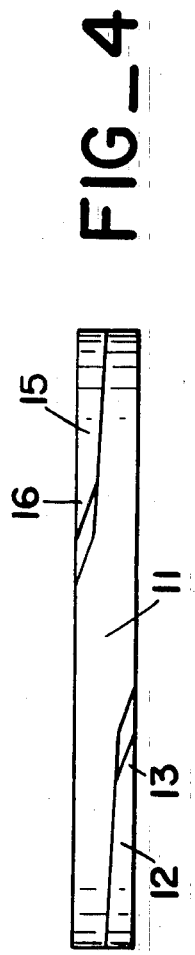
FIG_4

SPIRAL PISTON RING WITH TAPERED ENDS AND RECESSES

BACKGROUND OF THE INVENTION

Piston rings normally are made to fit in an annular groove in pistons and to bear against the walls of the cylinders in which the pistons run to make a sliding seal. Piston rings characteristically are made of springy metal. However, metal piston rings require lubrication and in uses where oil cannot be tolerated metal rings cannot be used. Oil cannot be used for compressing medical or chemically pure gases or in compressing oxygen, for example. In such uses self-lubricating rings must be used.

One excellent self-lubricating material is polytetrafluoroethylene which is also known as Teflon. Teflon not only is self-lubricating but it also withstands the heat that is generated by friction. Lubricated metal piston rings experience practically no wear. However, the self-lubricating quality of Teflon at least in part is provided by wearing away of the surface of the Teflon. In use, the high pressure side of the cylinder will tend to push the piston ring toward the low pressure side of the annular piston ring groove. This action permits high pressure to get behind the piston ring. The slight leakage between the piston ring and the cylinder wall creates a relatively low pressure on the exterior of the piston ring and the result of the pressure difference thus created is that the piston ring will be pushed tightly into contact with the cylinder wall. This action promotes good sealing but it also promotes piston ring wear.

One form of piston ring is a spiral piston ring. A piston ring made in the form of a spiral with one or more convolutions having abutting adjacent surfaces can be placed in the annular groove of a piston easily and it acts as a good seal against the cylinder wall. Spiral piston rings are disclosed in such early patents as U.S. Pat. No. 727,311 issued to Douglas et al., U.S. Pat. No. 1,165,084 issued to Flammang, U.S. Pat. No. 1,711,244 issued to Newton, and U.S. Pat. No. 1,819,890 issued to Gleason.

Since piston rings must bear against the walls of the piston ring groove in which they ride they must have square ends. With spiral piston rings this is accomplished in different ways. In the Gleason patent mentioned above the center convolutions are made with abrupt, step-like changes in shape to accomodate the square ends of the top and bottom convolutions. These changes in shape are difficult and expensive to machine. In addition, although with metal piston rings there is no sacrafice in function or strength by having step-like configurations, Teflon made in that way frequently experiences failure at the steps.

Other spiral rings are made with long tapered end portions such as those disclosed in the Flammang patent. The tapered end portions disclosed in the Flammang patent taper around about 180° of the angle of rotation of the cylinder and that gradual taper results in a sharp, almost knife-like end to the ring. To deal with these sharp ends the Flammang patent discloses an additional machining process to create a notch in the adjacent convolution of the helix to receive the end of the helix and a further step of cutting off the sharp end of the helix.

A sharp end at the end of a helix is dangerous when dealing with metal rings but not when dealing with rings made of Teflon. However, when the end of a Teflon ring is feathered too gradually a weak point is created that lends itself to being broken off in use.

SUMMARY OF THE INVENTION

This invention is a spiral, elastic piston ring made of a self-lubricating material and made in such a manner that it automatically takes up for wear while still maintaining a thorough sealing relationship with the wall of the cylinder in which it operates. The spiral convolutions of the ring of this invention have a rectangular cross section and both of the end portions of the convolutions taper around at least 90° of the angle of rotation of the cylinder. The end portions taper at an angle that causes all portions of opposite faces of the spiral to lie in planes parallel to each other and perpendicular to the axis of rotation of the cylindrical helix.

Each of the end portions of the helix ends in a terminal portion that is tapered at a steeper angle with respect to the planes mentioned above than the spiral does so that the feathered edge of the terminal portion is less gradual and more abrupt whereby the ends of the spiral terminate in a stronger configuration. In the product of this invention the convolution of the spiral piston ring adjacent the terminal portion includes an indentation that is exactly the size and shape of the terminal portion whereby the terminal portion of the spiral ring nests exactly in the indentation to form a square bottom and top for the piston ring and a continuous sidewall.

The invention also includes a method of manufacturing spiral rings having the characteristics described above. The method of manufacture begins with a tube of Teflon or other suitable material having a square bottom, that is, having the cylindrical portion of the tube terminate in a surface that lies in a single plane that is perpendicular to the axis to the cylinder. The spiral is produced by cutting the cylindrical wall with a knife such that the initial cut makes a very acute angle with the plane in which the terminal portion of the cylinder lies and when that cut is made around less than 40° of the angle of rotation of the cylinder the knife cuts at a more acute angle to that plane and around at least another 90° of the angle of rotation of the cylinder, whereby the width of the convolution being cut continuously increases. The knife keeps cutting at that angle cutting as many convolutions as is needed in the spiral piston ring to produce a piston ring having a desired thickness after which the knife angle changes again to cut a terminal portion at the same terminal portion angle as the original cut after which the knife is again adjusted to cut at 90° to the axis of rotation of the cylinder continuing that cut until the completed piston ring is severed from the cylinder.

With the above described method of manufacture the indentation in the convolution adjacent the terminal portion of the piston ring is done at the same time and from the same material as the terminal portion of the piston ring whereby the size, shape, and position of the indentation are exactly correct to receive the terminal portion of the piston ring.

BRIEF DESCRIPTION OF THE DRAWINGS

FIG. 1 is a view of a spiral piston ring embodying this invention illustrating the invention with all convolutions staightened out and laid flat;

FIG. 2 is an elevation view of a piston ring embodying this invention;

FIG. 3 is a view of the piston ring illustrated in FIG. 2 with the convolutions expanded;

FIG. 4 is a view of the piston ring of FIG. 2 illustrating its configuration after the bearing surfaces have worn down through use.

DETAILED DESCRIPTION OF THE INVENTION

Although the piston ring of the invention is never in a shape illustrated in FIG. 1, for convenience and ease of understanding FIG. 1 illustrates how a piston ring embodying this illustration would look if it were unwound and laid flat. The piston ring is generally designated 10 and it includes a portion 11 having parallel walls that abut adjacent convolution walls when the ring is in the form of a compressed helix. Extending from the portion 11 is an end portion 12 that is tapered at a very shallow angle so that the portion of the convolution it forms becomes thinner as it approaches terminal portion 13. Terminal portion 13 tapers at a steeper angle than end portion 12 and it ultimately terminates in a sharp tip.

On the other side of portion 11 there is a tapered portion 15 and a terminal portion 16 that correspond in shape, and are symmetric with portions 12 and 13.

Each portion 11 of the illustrated embodiment includes an indentation. Indentation 20 corresponds in size and shape with terminal portion 13 and indentation 21 corresponds in size and shape to terminal portion 16. When the piston ring of this invention is in its normal helical form as illustrated in FIG. 2, terminal portions 13 and 16 lie exactly within their respective indentations 20 and 21 with all adjacent edges of each convolution being in contact with one another.

As described above, during use the bearing surface 25 of the helical bearing will wear but the pressure difference between the inside of the cylinder ring and the portion adjacent the cylinder wall will cause the spiral piston ring to expand into good sealing contact with the piston wall. As this expansion is effected the terminal portions 13 and 16 move slightly out of indentations 20 and 21, as illustrated in FIG. 4, whereby the ring of this invention maintains all adjacent convolutions in tight contact with one another and readily expands by unwinding slightly to maintain the desired sealing relationship between the piston and the cylinder. It is emphasized that many portions of the drawings are exaggerated for purposes of illustration. Thus, terminal portions 13 and 16 are illustrated to be more abrupt than they are actually formed because it would be difficult to perceive them if drawn to exact scale. Therefore, the openings in indentations 20 and 21 as illustrated in FIG. 4 are much shallower than illustrated so that there is substantially no loss of sealing ability even at those portions of the piston ring where indentations 20 and 21 are open.

In the illustrated embodiment the spiral piston ring is made at an angle of rotation of about 700°, specifically with not quite two complete convolutions. Referring to FIGS. 2 and 4 specifically, it is again emphasized that the angles of indentations 20 and 21 and the corresponding surfaces of terminal portions 13 and 16 are much deeper and much more abrupt than an actual piston ring in order for them to be perceptible in the drawings. The very shallow angles and thin terminal portions of the actual piston ring are such that even in the position shown in FIG. 4 where the circumferential expansion of the ring to take for wear is evident, substantially the full width of the piston ring is available to seal between the piston and the cylinder One of the advantages of the spiral piston ring of this invention is that a single starting material and mode of manufacture can be employed for piston rings to fit grooves of any length, specifically, the height of the ring as shown in FIGS. 2 and 4. If the groove in a piston was wider than the piston rings illustrated in FIGS. 2 and 4, then cutting of the Teflon cylinder for a greater number of convolutions may continue until a piston ring of a desired height is obtained. Any piston ring having more than two complete convolutions, specifically, being made with an angle of rotation greater than 720°, will provide a good seal between a piston and the cylinder in which it operates in that it will have uniform thickness and square ends.

The end portions 12 and 15 should have a gradual taper, at an angle of not more than 10° and preferably not more than 5° with the plane of the top and bottom of the ring as illustrated in FIG. 2. The terminal portions 13 and 16 should be at an angle of not more than 20° with those planes, and preferably not more than 10°.

I claim:

1. A spiral piston ring comprising:
   a cylindrical spiral of continuous, elastic, self-lubricating material having a rectangular cross section,
   said spiral having end portions tapered around at least 90° of the angle of rotation of said cylinder, said end portions being tapered at a very acute angle to a plane perpendicular to the axis of rotation of said cylinder,
   each tapered end portion having a tapered terminal portion with the terminal portion being tapered at a less acute angle than said end portion taper with respect to said plane perpendicular to the axis of rotation,
   a recess in a convolution adjacent said terminal portion positioned to receive said terminal portion and having the exact size and shape to receive said terminal portion.

2. The piston ring of claim 1 wherein said terminal portion occupies about 40° of the angle of rotation of said cylinder.

3. The piston ring of claim 1 wherein said end portion occupies about 360° of the angle of rotation of said cylinder.

4. The process for producing a spiral piston ring from a right cylinder of continuous, elastic, self-lubricating material, said right cylinder having end surfaces with each end surface lying in a single plane, with both of said planes parallel to each other and perpendicular to the axis of rotation of said cylinder comprising:
   cutting into one of said end surfaces at an angle with respect to said plane of not greater than 20°
   continuing said cutting for not more than 10° of the angle of rotation of said cylinder, then cutting said cylinder at an angle not greater than 20° with respect to said plane for at least 720° of the angle of rotation of said cylinder, then cutting said cylinder at an angle equal to said first cut angle for a distance equal to the length of said first terminal portion, then cutting said cylinder in a plane perpendicular to said first plane for at least 360° of the angle of rotation of said cylinder.

* * * * *